(12) United States Patent
Caldani et al.

(10) Patent No.: US 8,531,121 B2
(45) Date of Patent: Sep. 10, 2013

(54) DRIVER CIRCUIT PARTICULARLY SUITED FOR LIGHTING DEVICES

(76) Inventors: Nelson Caldani, Richboro, PA (US); Tielei Zhang, Guangdong (CN)

(*) Notice: Subject to any disclaimer, the term of this patent is extended or adjusted under 35 U.S.C. 154(b) by 235 days.

(21) Appl. No.: 13/136,875

(22) Filed: Aug. 15, 2011

(65) Prior Publication Data

US 2013/0043806 A1    Feb. 21, 2013

(51) Int. Cl.
*H05B 41/36* (2006.01)

(52) U.S. Cl.
USPC ......... 315/209 R; 315/291; 315/307; 315/311

(58) Field of Classification Search
USPC .................. 315/77, 82, 209 R, 291, 307, 311
See application file for complete search history.

(56) References Cited

U.S. PATENT DOCUMENTS 5,612,597 A * 3/1997 Wood ............................ 315/293
6,617,807 B2 * 9/2003 Ito et al. ........................ 315/276

* cited by examiner

*Primary Examiner* — Jason M Crawford (57) ABSTRACT

Disclosed are various embodiments of driver circuits that operate to excite devices for light emissions therefrom regardless of the impedance ratings thereof. The driver circuits are particularly suited to service both low impedance light emitting diode lighting devices and high impedance halogen lamps.

11 Claims, 7 Drawing Sheets

DRIVER CIRCUIT PARTICULARLY SUITED FOR LIGHTING DEVICES

BACKGROUND OF THE INVENTION (1) Field of the Invention

The present invention relates to driving circuits for lighting devices. More particularly, the present invention relates to driving circuits, sometimes referred to as ballast circuits, that handle not only high impedance lighting devices, such as halogen lamps, but also low impedance lighting devices, such as light emitting diodes (LED). Specifically, the present invention provides driving circuits that operate and excite devices for light emissions therefrom regardless of the impedance ratings thereof.

(2) Description of the Prior Art

In various applications, such as in the automotive field, driving circuits are employed that receive a d.c. voltage which is converted to an a.c. voltage and utilized to excite lighting devices. The lighting devices are commonly connected to the output stage of the driver circuit by means of an E-Transformer, known in the art. These driving circuits operate well for exciting high impedance lighting devices, such as halogen lamps, but are plagued by problems when the lighting device is a low impedance device, such as a light emitting diode (LED). The inability to provide a driving circuit that employs an E-Transformer in its output stage that can successfully operate lighting devices having low or high impedance ratings places an undue restriction on the automotive industry. Accordingly, it is desired to provide a driving circuit having an E-Transformer in its output stage that is used to successfully operate lighting devices having a full range of impedance ratings.

SUMMARY OF THE INVENTION

Accordingly, it is an object of the present invention to provide a driving circuit that receives a d.c. voltage and employs an E-Transformer in its output stage for successfully connecting to a full range of lighting devices, including both high and low impedance types, such as halogen lamps and light emitting diodes (LEDs) respectively.

Another object of the present invention is to provide a driver circuit for handling both low and high impedance lighting devices and having an input stage receiving a d.c. voltage arranged in a half or full bridged configurations.

In accordance with the present invention a driver circuit is disclosed comprising: a) receiving means having input and output stages, a charge storage means, and means for discharging the charge storage means across the output stage upon reaching a predetermined voltage, the input stage of the receiving means receiving a d.c. voltage that is routed to the charge storage means; b) a switching coupler arranged in a bridged configuration having arms with each arm having input and output stages with the input stage thereof connected to the output stage of the receiving means, the switching coupler has a network in each of its arms and the network being comprised of a first resistor, a first inductor, and a first capacitor. The switching coupler further comprises a second inductor in each arm of the switching coupler and connected to a respective network providing induced and reversing currents at the output stage of the switching coupler; and c) a transformer having input and output stages with the input stage connected to the output stage of the switching coupler.

BRIEF DESCRIPTION OF THE DRAWINGS

Other objects, features and advantages of the present invention will become apparent upon reference to the following description of the preferred embodiments and to the drawings, wherein corresponding reference characters indicate corresponding elements throughout and wherein.

DETAILED DESCRIPTION OF THE PRESENT INVENTION

The practice of the present invention is best described by first referring to FIG. 1 which is a diagram of the prior art circuit 10 having disadvantages which are corrected by the practice of the present invention and composed of components having typical values/or type given in the below TABLE 1.

TABLE 1

| SYMBOL | TYPICAL VALUE/TYPE |
| --- | --- |
| R2A | 56 ohms |
| R2B | 51 ohms |
| R3 | 2.2 K ohms |
| R4 | 20 ohms |
| R5 | 20 ohms |
| R10 | 75 ohms |
| R11 | 75 ohms |
| C1 | 47 microfarads |
| C2 | 0.01 f microfarads |

TABLE 1-continued

| SYMBOL | TYPICAL VALUE/TYPE |
|---|---|
| C3 | 0.01 f microfarads |
| C4 | 0.33 f microfarads |
| C5 | 0.33 f microfarads |
| D3 | 1 A, 1000 V diode (Fast Diode) |
| D6 | 1 A, 1000 V diode (Fast Diode) |
| D7 | 1 A, 1000 V diode (Fast Diode) |
| T1 | DB3 Diac |
| N1 | Dynatron device |
| N2 | Dynatron device |
| T2 | T2-1, T2-2 and T2-3;2 to 4 turns per winding |
| TE | High Frequency Transformer |

Figure 1:
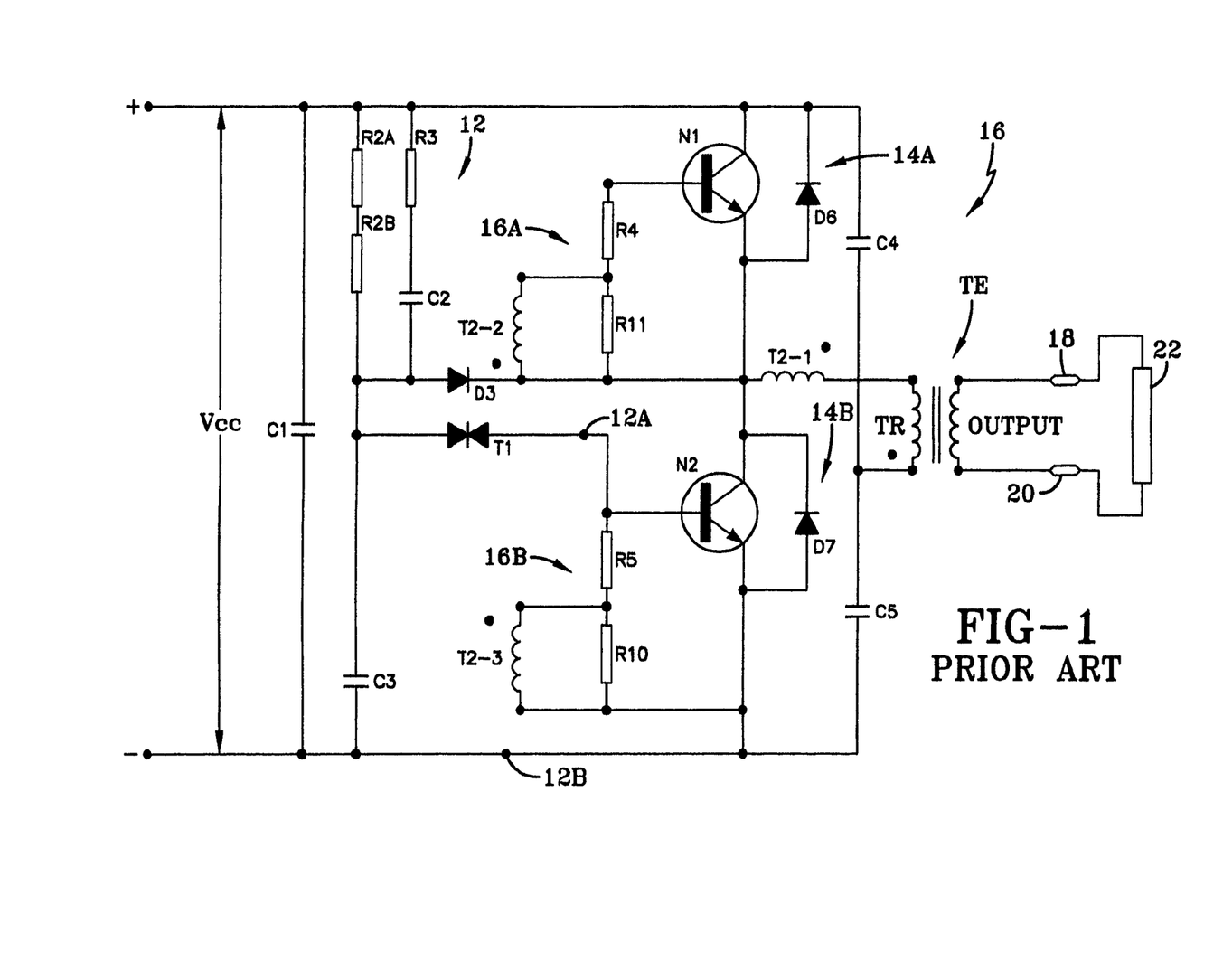
FIG. 1 is a diagram of a prior art driving circuit plagued by the problem of the inability to successfully service low impedance lighting devices, such as light emitting diodes (LEDs).

The prior art driver circuit 10 comprises a receiving means 12 that includes components R2A, R2B, R3, C1, C2, C3, D3 and a semiconductor device T1 having a liminal or threshold value, all arranged as shown in FIG. 1. The receiving means 12 has an input stage with terminals + and − for receiving a d.c. voltage, Vcc, and an output stage located across output nodes 12A and 12B. The capacitor C3 serves as a charge storage means and the device T1 serves as means for discharging the charge storage means C3 across the output nodes 12A and 12B upon reaching a predetermined voltage.

The driver circuit 10 further comprises a switching arranged in a half-bridged configuration having arms each of which is comprised of elements 14A and 14B. Element 14A, in turn, is composed of transistor device N1, diode D6, and capacitor C4, whereas element 14B is composed of transistor device N2, diode D7, and capacitor C5. The elements 14A and 14B are arranged as shown in FIG. 1.

The switching coupler made up of first and second arms comprised of elements 14A and 14B respectively further comprises an inductor T2 having windings T2-1, T2-2, and T2-3, arranged as shown in FIG. 1, especially with regard to their phase parameter as indicated by their respective dot (.) symbol. The inductor T2 provides inductive switching wherein the overall operation of FIG. 1 is affected by the back emf generated by the inductor T2 and by the phase relationship of the induced and counter currents produced by inductor T2.

The driver circuit 10 further comprises resistor networks 16A and 16B, with resistor network 16A being comprised of resistors R4 and R11, and further with R4 being connected to the control element of transistor device N1, whereas resistor network 16B is comprised of resistor R5 and R10, and with one side of resistor R5 being connected to the control element of transistor device N2. The transistor devices N1 and N2 may be dynatron devices, known in the art, having a negative-resistance characteristic. The resistor R10 is arranged across winding T2-3 of inductor T2 and the resistor R11 is arranged across winding T2-2 both as shown in FIG. 1.

The driver circuit 10 still further comprises an E-Transformer TE, known in the art, having one end of its input stage TR connected to a junction between capacitors C4 and C5 and the other end of its input stage connected to the output of the winding T2-1 of inductor T2 as shown in FIG. 1. The TE transformer has its output stage connected across terminals 18 and 20 which, in turn, are connected across the lighting device 22. The lighting device 22 may be a high impedance device, such as a halogen lamp, or it may be a low impedance device, such as a light emitting diode.

The driving circuit 10 of FIG. 1 has limitations for providing the proper excitation and operation of a low impedance light emitting diode lighting device (LED), and which may now be further described with regard to the operation thereof.

Operation of Prior Art Driver Circuit (FIG. 1)

With reference to FIG. 1, when a d.c. voltage, Vcc, is applied across terminals + and −, capacitor C3, serving as a charge storage means, is charged by way of R2A and R2B. When the voltage value across capacitor C3 reaches the semiconductor device T1 limital or threshold value, T1 conducts and renders transistor device N2 conductive.

After the device N2 is rendered conductive, an output voltage appears across terminals 18 and 20. The voltage across terminals 18 and 20 is formed by a loop through C4, the input stage of TE identified by the symbol TR, winding T2-1 of inductor T2 and the transistor device N2. The flow of current through winding T2-1 causes winding T2-3 to induce a corresponding current that speeds up the conduction of transistor device N2 by driving transistor device N2 into saturation. Device N2 being driven into saturation, in turn, causes winding T2-1 of inductor T2 to be saturated. Winding T2-1 being saturated causes the winding T2-3 of inductor T2 to induce a correspondingly counter current which, in turn, renders transistor device N2 non-conductive.

Due to the opposition of the phases of the currents created by the arrangement of windings T2-2 and T2-3 of inductor T2 shown in FIG. 1, when T2-3 reverses phase and produces a counter current, T2-3 produces a frontal induced current which renders transistor device N1 conductive. The conductive principal of device N1 is the same as that of the previously discussed device N2. In response to the transistor device N1 conducting, the voltage across terminals 18 and 20 is formed by a loop through device N1, winding T2-1 of inductor T2, the input stage of TE transformer identified by the symbol TR, and by capacitor C5.

The above described processes occur after each burst of current flowing through T2-1 until T2-1 does not sense a voltage or a surge. Further, the above described processes cause the prior art circuit 10 of FIG. 1 to operate in a circular manner, with regard to the circuit elements as previously described, which also causes devices N1 and N2 to conduct in a circular manner until devices N1 and N2 stop conducting.

From FIG. 1, it should be noted that the output end of the E-transformer arranged across terminals 18 and 20, when in a condition of no load or low load, for example, when a low impedance LED lighting device 22, such as a LED lighting device, is connected across terminals 18 and 20, the voltage across winding T2-1 is relatively low and the induced current created by T2-1 is correspondingly low, so low that the transistor (dynatron) devices N1 or N2 cannot be rendered conductive in a manner as previously described and, therefore, the prior art circuit 10 of FIG. 1 cannot produce the desired excitation to operate the low impedance lighting device 22, such as the LED lighting device. This problem is corrected by the practice of the present invention and may be further described with reference to FIG. 2, which illustrates all the components given in Table 1, except for resistor R10 and R11, and in addition thereto preferably the components listed in Table 2.

TABLE 2

| SYMBOL | TYPICAL VALUE/TYPE |
|---|---|
| D11 | 1 A, 1000 V Ultra Fast Diode (Schottky) |
| D12 | 1 A, 1000 V Ultra Fast Diode (Schottky) |
| D13 | 1 A, 1000 V Ultra Fast Diode (Schottky) |
| D14 | 1 A, 1000 V Ultra Fast Diode (Schottky) |

TABLE 2-continued

| SYMBOL | TYPICAL VALUE/TYPE |
| --- | --- |
| C7 | 1 microfarad |
| C8 | 1 microfarad |
| L1 | 7 microhenries to 60 microhenries |
| L2 | 7 microhenries to 60 microhenries |

Figure 2:
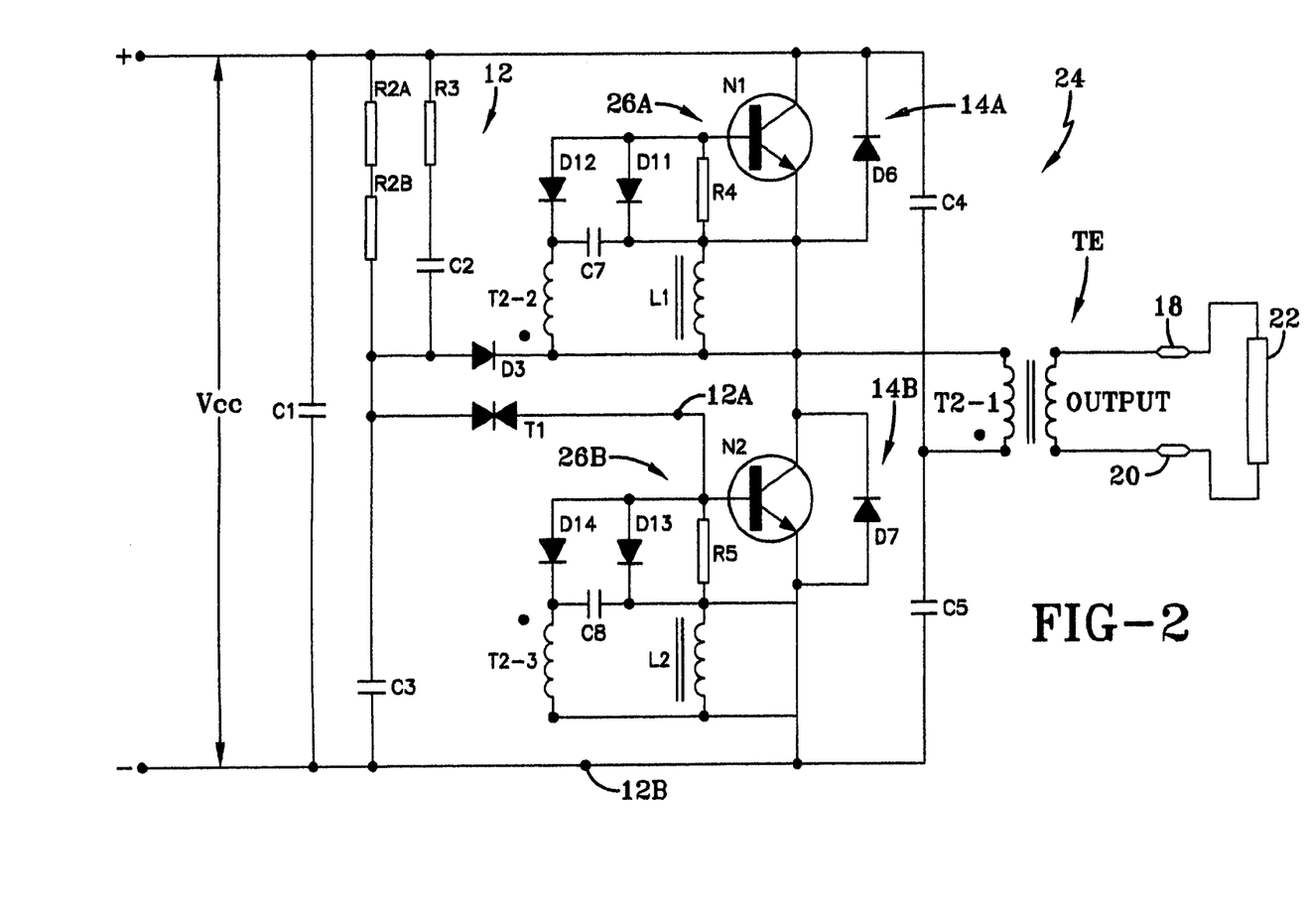
FIG. 2 is a diagram of one embodiment of the present invention that employs a switching coupler arranged in a half-bridge configuration and employing a network comprised of a resistor, capacitor, and a first inductor network which cooperatively operate to provide a driving circuit capable of handling both high and low impedance lighting devices, such as halogen lamps and light emitting diodes (LEDs) respectively.

A comparison between the driver circuit 10 of FIG. 1 and the driver circuit 24 of FIG. 2, reveals that the primary winding, identified by the symbol TR, of the TE transformer of FIG. 1 is removed from FIG. 2 of the driver circuit 24. Further, the winding T2-1 of inductor T2 of FIG. 2 is now arranged at the input stage of the TE transformer thereby replacing the primary winding TR of the TE transformer. The elimination of the primary winding TR eliminates current sampling, provided by the primary winding identified as TR, from the operation of driver circuit 24. Further, the operation of circuit driver 24 now advantageously adapts voltage sampling by providing windings T2-2 and T2-3 of inductor T2, both arranged as shown in FIG. 2.

A further comparison between FIGS. 1 and 2 reveals that the resistors R10 and R11 of FIG. 1 have been replaced in FIG. 2 by inductors L2 and L1, respectively. Further, the driver circuit 24 of FIG. 2 has the capacitor C7 and C8, respectively interposed between R4 and winding T2-2 of inductor T2, and R5 and winding T2-3 of inductor T2. The driver circuit 24 further comprises diodes D11 and D12 and D13 and D14 connected across R4 and R5, respectively, and also respectively interconnected to the control electrode of the transistor devices N1 and N2. In addition, capacitors C7 and C8 are interposed in the operation of transistor devices N1 and N2, respectively by way of resistors R4 and R5 which, in turn, are respectively connected to the control electrodes of transistor devices N1 and N2.

The driver circuit 24 of FIG. 2 has first and second switching couplers, respectively, comprised of (1) elements N1, R4, L1, C7 and winding T2-2 and (2) elements N2, R5, L2, C8 and winding T2-3. Windings T2-2 and T2-3 are in the output stage of their respective switching coupler.

Further, circuit driver 24 of FIG. 2 includes elements 26A and 26B arranged in a half-way bridged configuration serving as first and second arms, and wherein element 26A includes a first network comprised of resistor R4, inductor L1, capacitor C7, and preferably diodes D11 and D12, whereas element 26B includes a second network comprised of resistor R5, inductor L2, capacitor C8, and preferably diodes D13 and D14. Still further, the first network of the first arm operatively cooperates with a second inductor (winding T2-2) which provides induced and reversing current at the output stage of the first arm, and, similarly, the second network of the second arm operatively cooperates with a second inductor (winding T2-3) which provides induced and reversing currents at the output stage of the second arm.

Operation of One of the Embodiment of the Present Invention (FIG. 2)

With reference to FIG. 2, when a d.c. voltage, Vcc, is applied across terminals + and −, capacitor C3, serving as a charge storage means, is charged by way of R2A and R2B. When the voltage value across capacitor C3 reaches the semiconductor device T1 limital or threshold value, T1 conducts and renders transistor device N2 conductive.

After the transistor device N2 is rendered conductive, an output voltage appears across terminals 18 and 20. The voltage across terminals 18 and 20 is formed by a loop through C4, winding T2-1 of inductor T2 and the transistor device N2. The flow of current through winding T2-1 causes winding T2-3 to induce a corresponding current that charges C8. The current through resistor R5 drives transistor device N2 into saturation. This condition of device N2 being in saturation continues until C8 is fully charged thereby eliminating the current driving transistor device N2 into saturation, which, in turn, renders transistor device N2 non-conductive.

During the time when transistor device N2 starts to enter its non-conductive state, the current flowing in the winding T2-1 of inductor T2 reduces the winding voltage reversals therein, as well as the winding voltages reversals of T2-2 and T2-3. The reduction in the winding voltage reversals of windings T2-1, T2-2, and T2-3 thereof increases the speed in which transistor device N2 is rendered non-conductive. The speed at which transistor device N2 is rendered non-conductive is further increased by the presence of diodes D13 and D14.

When transistor device N2 is rendered non-conductive it causes the voltage of winding T2-2 to reverse and produce a frontal induced current causing C7 to begin charging which, in turn, renders transistor device N1 conductive by way of resistor R4.

When transistor device N1 is conductive an input voltage forms through a loop comprised of transistor device N1, winding T2-1 of inductor T2 and capacitor C5. This formation occurs until capacitor C7 is finished charging.

The condition of transistor device N1 being conductive continues until capacitor C7 is fully charged thereby eliminating the current driving transistor device N1 into saturation which, in turn, renders transistor device N1 non-conductive. The speed at which device N1 is rendered non-conductive so as to allow the discharge thereof is increased by the presence of diodes D11 and D12.

From FIG. 2 it should be noted that due to the placement of inductors L1 and L2 into the arrangements of control elements of transistor devices N1 and N2, respectively, the values of inductors L1 and L2 may be respectively selected to adjust the sensitivity and driving capacity of transistor devices (dynatrons) N1 and N2.

The above described processes related to driver circuit 24 occur after each burst of current developed by winding T2-3 in the output stage of the second arm of the bridged configuration of driver circuit 24, until winding T2-3 does not sense a voltage or a surge. Further, the above described processes cause the circuit 24 of FIG. 2 to operate in a circular manner, with regard to the current elements previously described, which also causes transistor devices N1 and N2 to conduct in a circular manner until transistor devices N1 and N2 stop conducting. Further, the winding T2-2 of inductor T2 located in the output stage of the second arm of the bridged configuration of the driver circuit 24 operates in a similar manner as winding T2-3.

From FIG. 2, it should be noted that even though the output end of the TE transformer, across terminals 18 and 20, when in a condition of no load or low load, for example, when a LED lighting device 22 is connected across terminals 18 and 20, the voltage across winding T2-1 of transformer T2 will also have a certain voltage, so long as the voltage Vcc is present. So long as voltage Vcc is present, winding T2-3 of inductor T2 can induce a voltage to charge C8 so long as the liminal value of device T1 is exceeded by way of circuit arrangement of capacitor C3 and transistor device T1 which, in turn, allows the conduction and non-conductive states of dynatron devices N1 and N2 to be realized and, which, in turn, provides the proper excitation of the low impedance light emitting diode (LED) or high impedance device being a halogen lamp.

A further embodiment of the present invention that provides a ballast or drive circuit 28 that delivers the proper excitation for both halogen and LED lighting devices may be described with reference to FIG. 3, which illustrates the arrangement of all of the components of the drive circuit 24 of FIG. 2, but in addition thereto illustrates the arrangement of all of the components given on the below TABLE 3.

TABLE 3

| SYMBOL | TYPICAL VALUE/TYPE |
|---|---|
| R25 | 20 ohms |
| R26 | 20 ohms |
| D23 | 1 A, 1000 V Ultra Fast Diode (Schottky) |
| D24 | 1 A, 1000 V Ultra Fast Diode (Schottky) |
| D25 | 1 A, 1000 V Ultra Fast Diode (Schottky) |
| D26 | 1 A, 1000 V Ultra Fast Diode (Schottky) |
| L3 | 7 microhenries to 60 microhenries |
| L4 | 7 microhenries to 60 microhenries |
| N3 | Dynatron device |
| N4 | Dynatron device |
| C15 | 0.1 microfarads |
| C16 | 0.1 microfarads |
| T2-4 | 2 to 4 turns on winding |
| T2-5 | 2 to 4 turns on winding |

Figure 3:
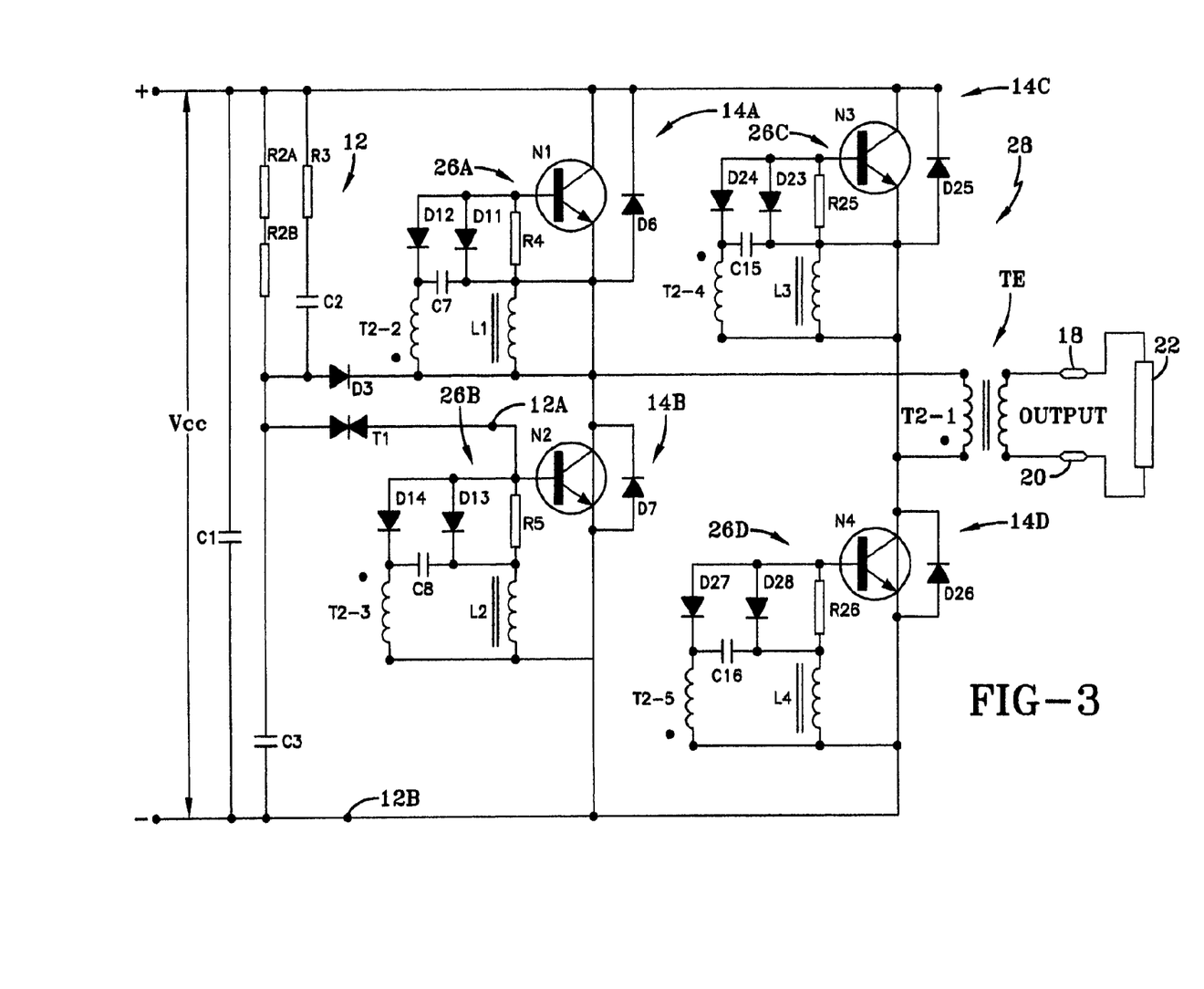
FIG. 3 illustrates another embodiment of the present invention that provides a switching coupler arranged in a full-bridged configuration and employing first and second arrangements of networks each comprised of a resistor, capacitor, first inductor that also cooperatively operate to provide a driving circuit to handle both low and high impedance lighting devices.

A comparison between FIGS. 2 and 3 reveals that FIG. 2 illustrates the half-bridge driving circuit 24, whereas FIG. 3 illustrates a full-bridge driving circuit 28. The full-bridge circuit 28 also has elements 14C and 14D and having components similar to and similarly arranged as elements 14A and 14B respectively previously described with reference to FIG. 2. Each of elements 14A, 14B, 14C, and 14D serve as arms of their respective bridged configuration. The full-bridged configuration of FIG. 3 comprise elements 26A, 26B, 26C, and 26D, each serving as a switching coupler in the respective arms and each having a respective second inductor in their respective output stage.

The half-bridge drive circuit 24 is particularly suited for supplying the excitation for driving low power lighting devices, whereas the full-bridge drive circuit 28 is particularly suited for supplying the excitation for driving high power lighting devices. Both the half-bridge drive circuit 24 and the full-bridge drive circuit 28 advantageously provide voltage sampling.

The full-bridge drive circuit 28 is arranged so that windings T2-2 and T2-5 of inductor T2 have the same potential and, similarly, windings T2-3 and T2-4 of inductor T2 have the same potential. Further, the full-bridge circuit 28 is arranged so that windings T2-2 and T2-5 of inductor T2, respectively drive dynatron devices N1 and N4 into simultaneous conduction or are simultaneous rendered non-conductive, whereas windings T2-3 and T-4 of inductor T2, respectively drive dynatron devices N2 and N3 into simultaneous conduction or are simultaneously rendered non-conductive.

The full-bridge drive circuit 28 operates in the same manner as described for the half-bridge drive circuit 24, with the addition thereto that the transistor devices N1 and N4 act in unison as a pair being rendered conductive and/or non-conductive and, similarly, transistor devices N2 and N3 also act in unison as a pair being rendered conductive and or non-conductive.

Figure 4:
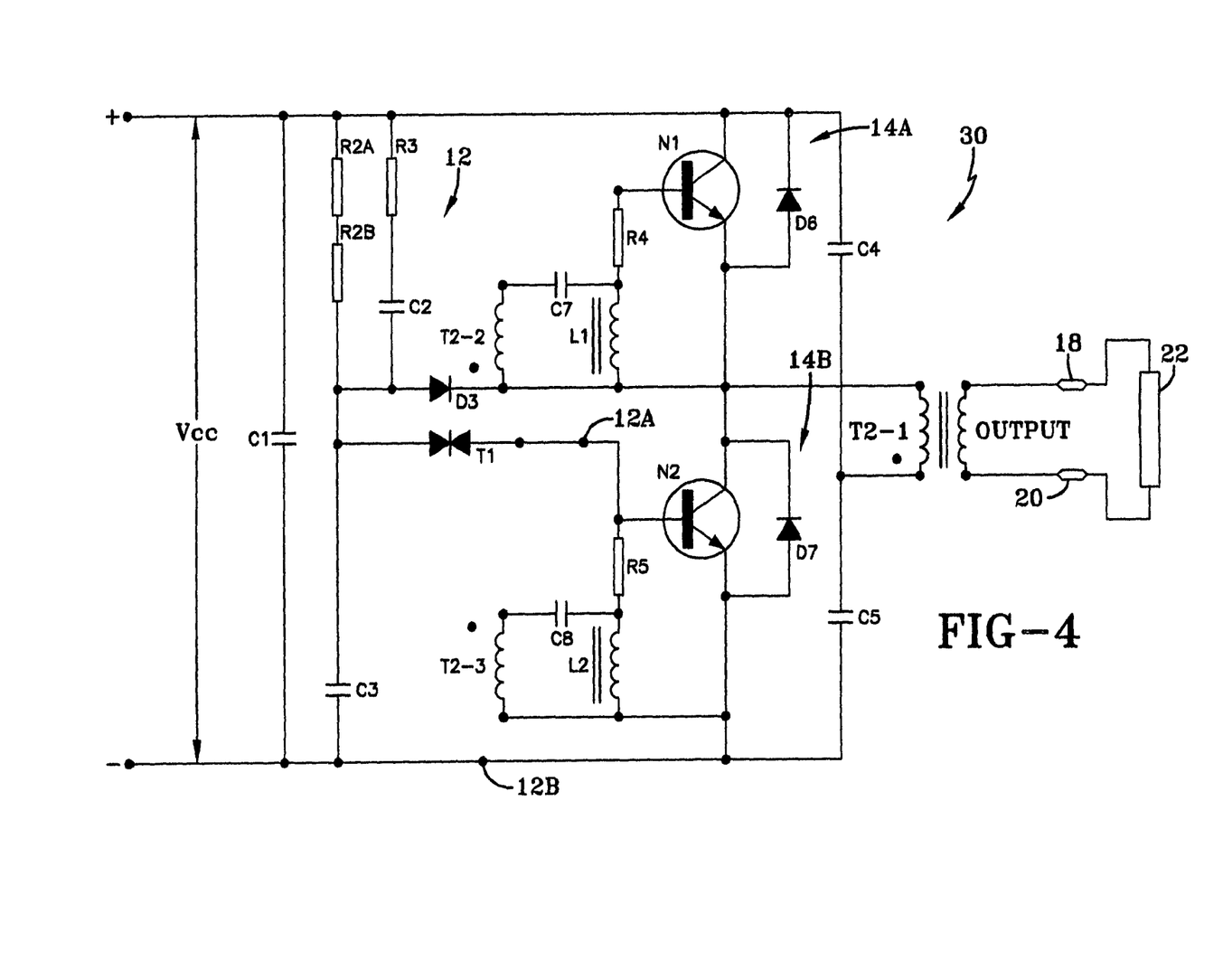
FIG. 4 illustrates another embodiment of the present invention, similar to that of FIG. 2, but devoid of any diodes that operatively cooperate with the network comprised of a resistor, capacitor and first inductor while still providing a driving circuit to handle both low and high impedance lighting devices.

A further embodiment of the present invention is shown in FIG. 4 which illustrates a drive circuit 30. Drive circuit 30 comprises the same components and arrangement thereof of drive circuit 24 of FIG. 2, with the exception that drive circuit 30 is devoid of diodes D11, D12, D13, and D14. Drive circuit 30 operates in the same manner as described for the half-bridge circuit 24 of FIG. 2, with the exception that drive circuit 30 is devoid of the benefits of D12, 13, and D14, previously described for drive circuit 24.

Figure 5:
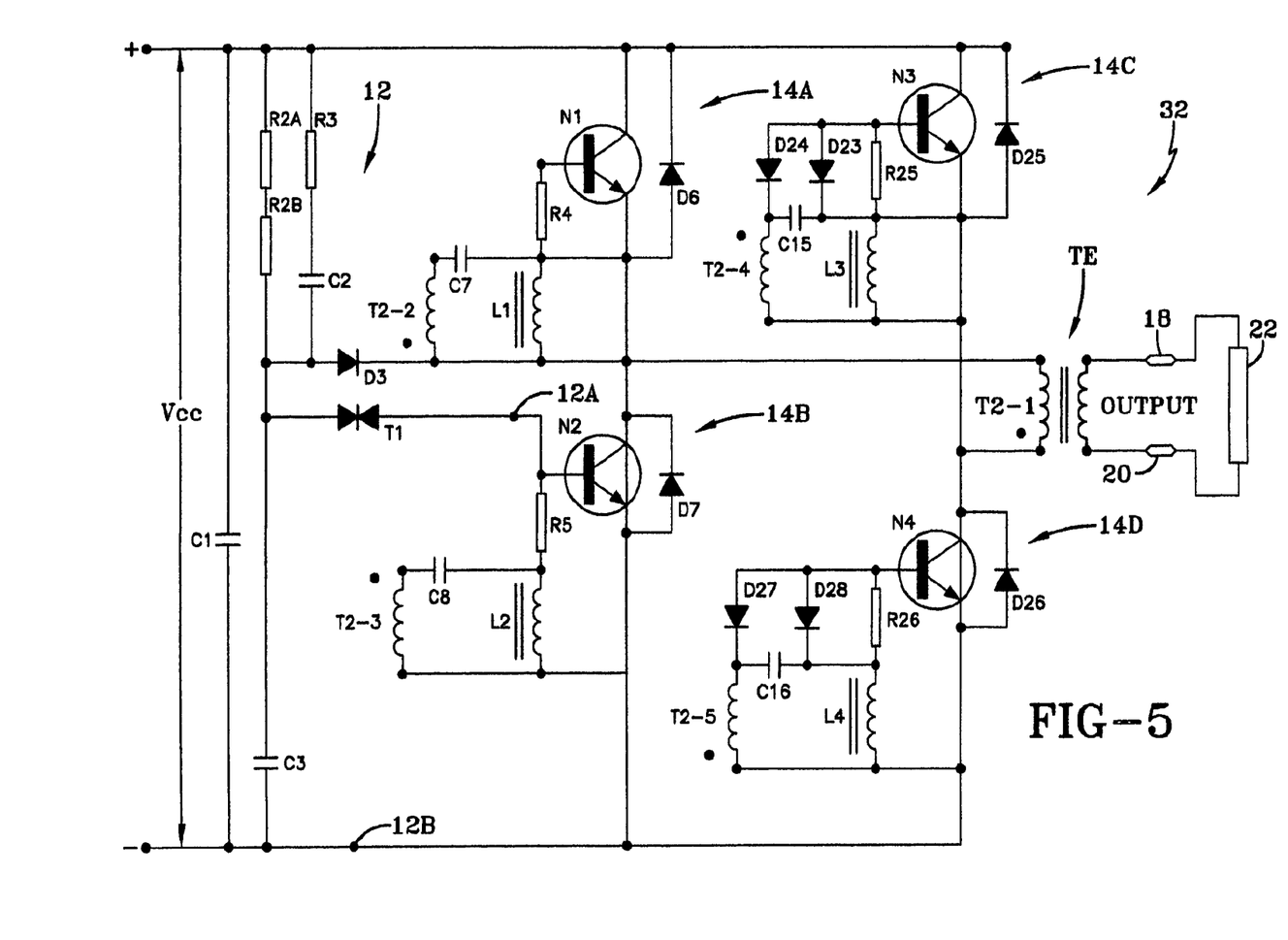
FIG. 5 is another embodiment of the present invention similar to that of FIG. 3, but devoid of any diodes that operatively cooperate with the network comprised of a resistor, capacitor and first inductor while still providing a driving circuit to handle both low and high impedance lighting devices.

A still further embodiment of the present invention is shown in FIG. 5 which illustrates a drive circuit 32. Drive circuit 32 comprises the same components and arrangement thereof as drive circuit 28 of FIG. 3, with the exception that drive circuit 32 is devoid of diodes D11, D12, D13, D14, D23, D24, D25, and D26. Drive circuit 32 operates in the same manner as described for the full-bridge circuit 28 of FIG. 3, with the exception that drive circuit 32 is devoid of the benefits of D11, D12, D13, D14, D23, D24, D25, and D26 previously described for the drive circuit 28.

Figure 6:
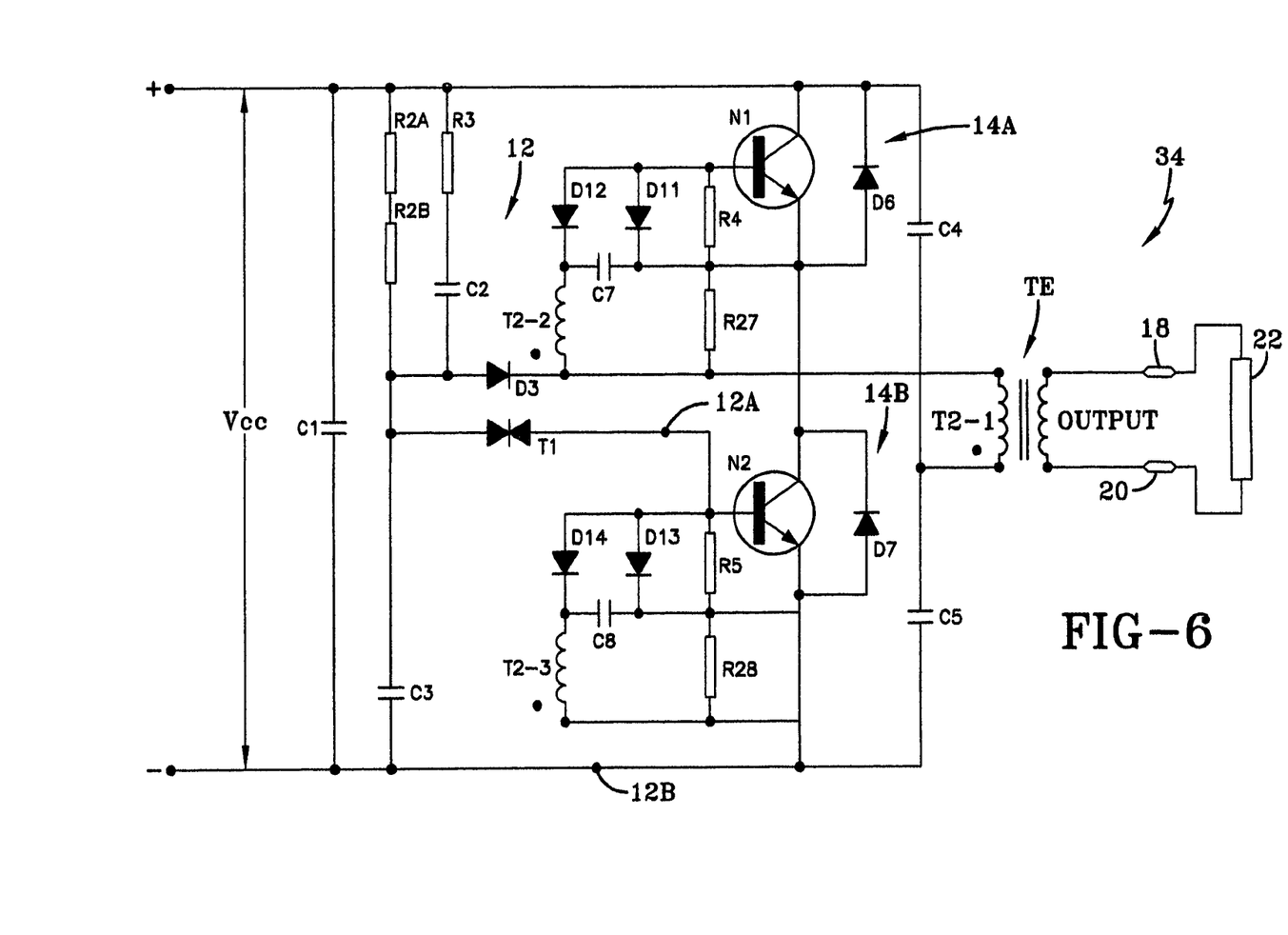
FIG. 6 illustrates an embodiment similar to the FIG. 2 of the present invention, but utilizes a network comprised of a first resistor, a capacitor and a second resistor to provide the proper excitation for both low and high impedance lighting devices.

An additional embodiment of the present invention is shown in FIG. 6, which illustrates a drive circuit 34. Drive circuit 34 comprises the same components and arrangement thereof of drive circuit 24 of FIG. 2 with the exception that the inductors L1 and L2 of drive circuit 24 have been respectively replaced with resistors R27 and R28 having typical values given in the below TABLE 4.

TABLE 4

| SYMBOL | TYPICAL VALUE/TYPE |
|---|---|
| R27 | 150 ohms |
| R28 | 150 ohms |

Drive circuit 34 operates in the same manner as drive circuit 24 of FIG. 2 with the exception that the selection of the values of resistors R27 and R28 determine the driving capability of drive circuit 34, rather than the values selected for L1 and L2 previously described with reference to drive circuit 24 of FIG. 2.

Figure 7:
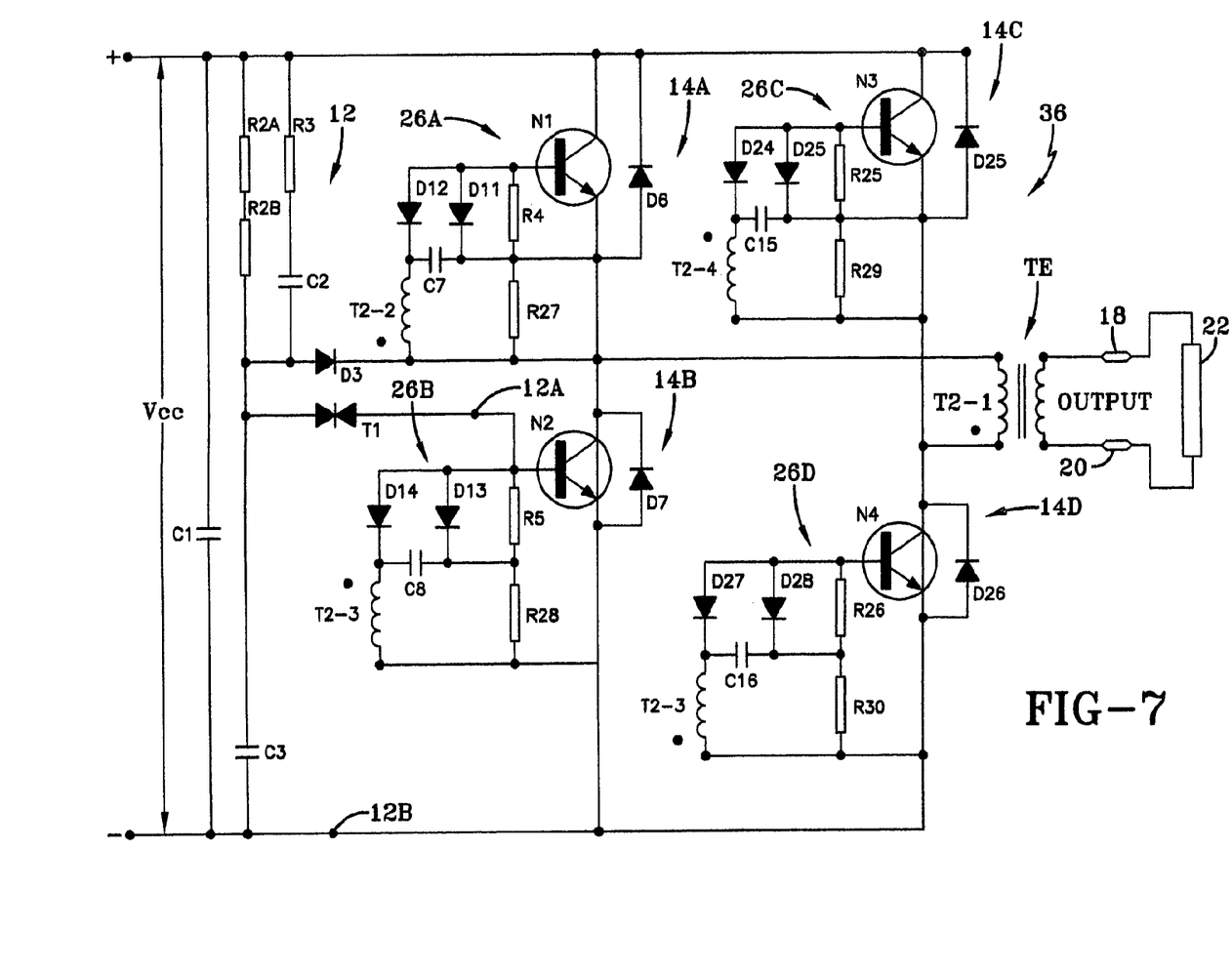
FIG. 7 illustrates an embodiment similar to FIG. 3, but utilizes first and second arrangements of networks comprised of a first resistor, a capacitor, and a second resistor to provide the proper excitation for both low and high impedance lighting devices.

A further additional embodiment of the present invention is shown in FIG. 7 which illustrates a drive circuit 36. Drive circuit 36 comprises the same components and arrangement thereof drive circuit 28 of FIG. 3 with the exception that the inductors L1, L2, L3, and L4 of drive circuit 28 have been respectively replaced with resistors R27, R28, R29, and R30 having typical values given on the below TABLE 5.

TABLE 5

| SYMBOL | TYPICAL VALUE/TYPE |
|---|---|
| R27 | 150 ohms |
| R28 | 150 ohms |
| R29 | 150 ohms |
| R30 | 150 ohms |

Drive circuit 36 operates in the same manner as drive circuit 28 of FIG. 3, with the exception that the selection of the values of resistors R27, R28, R29, and R30 determine the driving capability of drive circuit 36, rather than the values selected for L1, L2, L3, and L4, previously described with reference to drive circuit 28 of FIG. 3.

It should now be appreciated that the practice of the present invention provides multiple embodiments each providing a drive circuit that successfully provides excitation for lighting devices including low impedance devices (e.g. LED lamps) and high impedance devices (e.g. halogen lamps).

It will be understood that many additional changes in the details, materials, steps and arrangement of parts, which have been herein described and illustrated in order to explain the nature of the invention, may be made by those skilled in the art within the principle and scope of the expressed in the appended claims.

What is claimed is:

1. A driver circuit comprising:
   a) receiving means having input and output stages, a charge storage means, and means for discharging said charge storage means across said output stage of said receiving means upon reaching a predetermined voltage, said input stage of said receiving means receiving a d.c. voltage that is routed to said charge storage means;
   b) a switching coupler arranged in a bridged configuration having arms with each arm having input and output stages with the input stage thereof connected to said output stage of said receiving means, said switching coupler having a network in each of its arms and said network being comprised of a first resistor, a first inductor, and a first, capacitor, said switching coupler further having a second inductor in each arm of the switching coupler and connected to a respective network and which provides induced and reversing currents at the output stage of said switching coupler; and
   c) a transformer having input and output stages with the input stage connected to said output stage of said switching coupler.

2. The driver circuit according to claim 1, further comprising a lighting device connected to said output stage of said transformer.

3. The driver circuit according to claim 1, wherein said switching coupler is arranged in a half-bridged configuration having first and second arms.

4. The driver circuit according to claim 1, wherein said switching coupler is arranged in a full-bridged configuration having first, second, third and fourth arms.

5. The driver circuit according to claim 1, wherein said switching coupler has a negative resistance characteristic.

6. The driver circuit according to claim 5, wherein said switching coupler having a negative resistance characteristic includes at least two dynatron devices.

7. The driver circuit according to claim 6, wherein said switching coupler is arranged in a half-bridged configuration and each of said two dynatron devices has a control stage connected to said networks comprised of said first resistor, first capacitor and first inductor located in first and second arms of said switching coupler.

8. The driver circuit according to claim 6, wherein said switching coupler is arranged in a full-bridged configuration and includes four dynatron devices each having a control stage connected to said networks comprised of said first resistor, first capacitor and first inductor located in first, second, third and fourth arms of said switching coupler.

9. The driver circuit according to claim 1, further comprising first and second diodes interposed within each of said network comprised of said first resistor, first capacitor and first inductor.

10. A driver circuit comprising:
    a) receiving means having input and output stages, a charge storage means, and means for discharging said charge storage means across said output stage upon reaching a predetermined voltage, said input stage receiving a d.c. voltage that is routed to said charge storage means;
    b) a switching coupler arranged in a bridged configuration having arms with each arm having input and output stages with the input stage thereof connected to said output stage of said receiving means, said switching coupler having a first resistor, a second resistor, and a first capacitor network along with a second inductor in each arm of the switching coupler and connected to a respective network and which provides induced and reversing currents at the output stage of said switching coupler; and
    c) a transformer having input and output stages with the input stage connected to said output stage of said switching.

11. The driver circuit according to claim 1, wherein said transformer is an E-transformer.

\* \* \* \* \*